Oct. 14, 1924.
M. H. STARR
SCALE
Filed Feb. 1, 1921
1,511,531
3 Sheets-Sheet 1
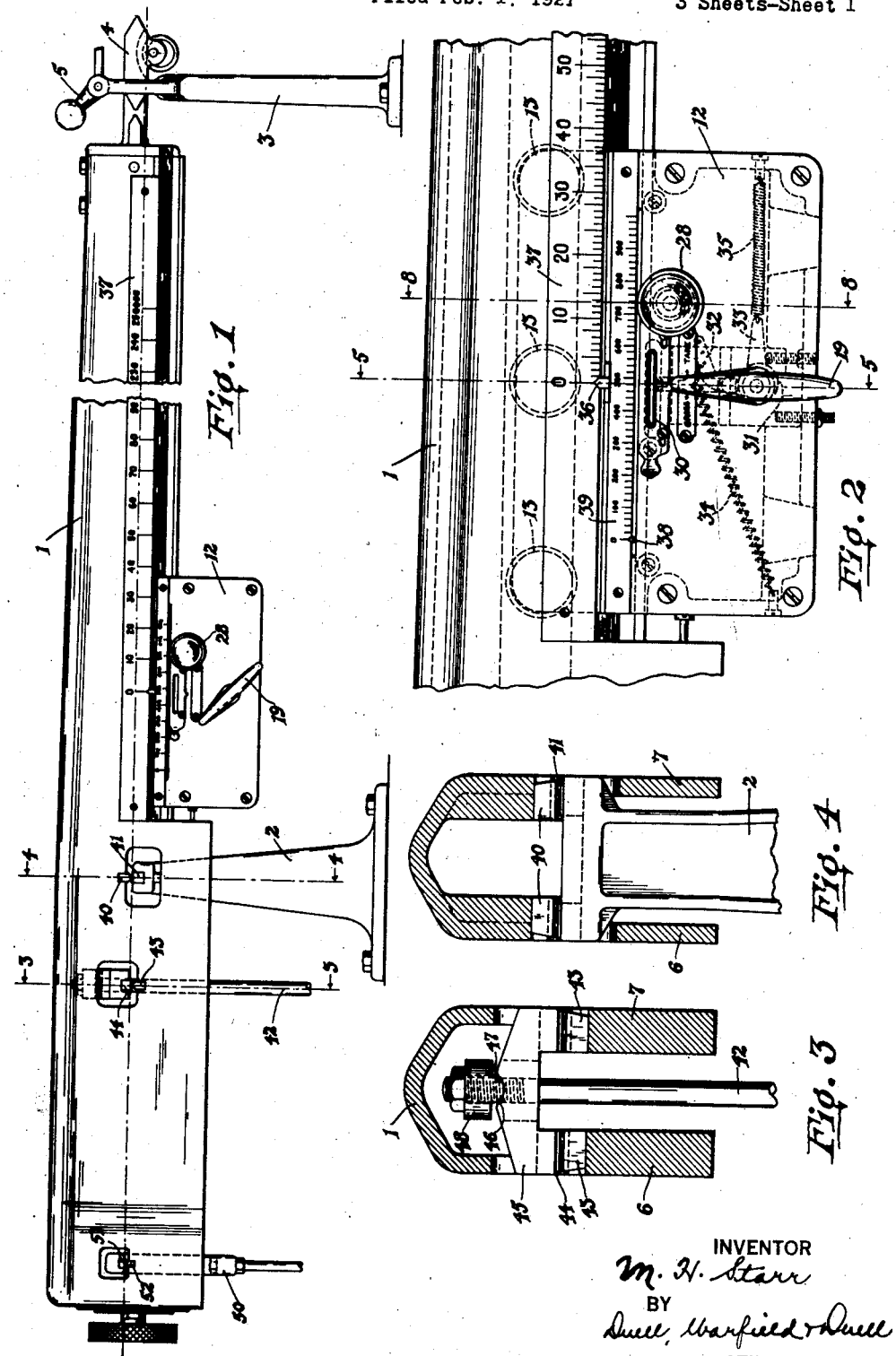
INVENTOR
M. H. Starr
BY
Duell, Warfield & Duell
ATTORNEY Oct. 14, 1924.

M. H. STARR

SCALE

Filed Feb. 1, 1921

INVENTOR
M. H. Starr
BY
Duell, Warfield & Duell
ATTORNEY

Patented Oct. 14, 1924.

1,511,531

UNITED STATES PATENT OFFICE.

MORTON H. STARR, OF ST. JOHNSBURY, VERMONT, ASSIGNOR TO E. AND T. FAIRBANKS AND COMPANY, OF ST. JOHNSBURY, VERMONT, A CORPORATION OF VERMONT.

SCALE.

Application filed February 1, 1921. Serial No. 441,544.

*To all whom it may concern:*

Be it known that I, MORTON H. STARR, a citizen of the United States, residing at St. Johnsbury, in the county of Caledonia and State of Vermont, have invented certain new and useful Improvements in Scales, of which the following is a full, clear, and exact description, such as will enable other skilled in the art to which it appertains to make and use the same.

This invention relates to weigh-beams for use with scales, and more particularly for use with high capacity scales such as are adapted for installation on railway tracks to weigh cars and other heavy loads.

It is an object of the invention to provide an improved weigh-beam of the character mentioned which is relatively simple in construction and reliable and exact in function under all conditions of service.

Another object is to provide an improved means for associating a traveling poise with the weigh-beam whereby the center of gravity of the poise is unchanging relatively to the points of suspension thereof under varying conditions of service, and is unaffected by slight irregularities in beam or poise condition.

Another object is to provide a weigh-beam with improved means for housing and protecting the poise and other operating elements from accumulations of dirt, moisture, rust or the like.

Still another object is to provide an improved means for aligning the poise in correct position relatively to the beam and for locking the same in aligned position, whereby errors are minimized.

Another object is to provide improved automatic locking mechanism for adjusting the center of gravity of the beam relatively to its points of suspension.

A further object is to provide an improved beam whereby the load transmitted thereto is delivered to the longitudinal center line thereof, thereby eliminating torsional stresses in the frame.

Other objects will be in part obvious from the following detailed description and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings wherein a typical, preferred embodiment of the invention is disclosed.

Figure 1 is a side elevation of the improved weigh-beam;

Fig. 2 is a fragmentary enlarged elevation showing the poise construction;

Fig. 3 is a transverse sectional view on line 3—3 of Fig. 1;

Fig. 4 is a transverse sectional view on the line 4—4 of Fig. 1;

Figure 5:
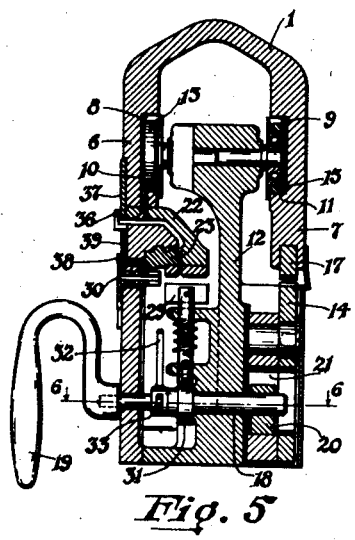
Fig. 5 is a sectional view on the line 5—5 of Fig. 2 showing details of poise construction and suspension.
Figure 6:
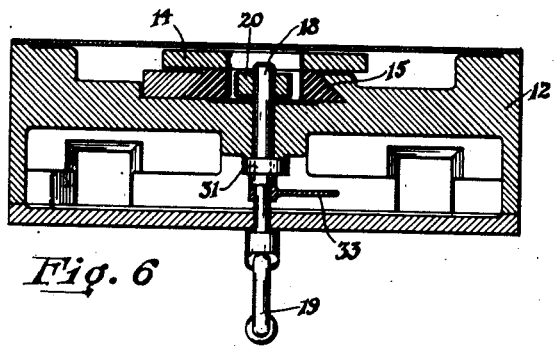
Fig. 6 is a horizontal sectional view on the line 6—6 of Fig. 5.
Figure 9:
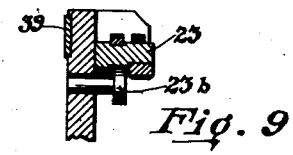
Fig. 9 is a section of a detail showing the fractional poise and supporting means therefor.
Figure 7:
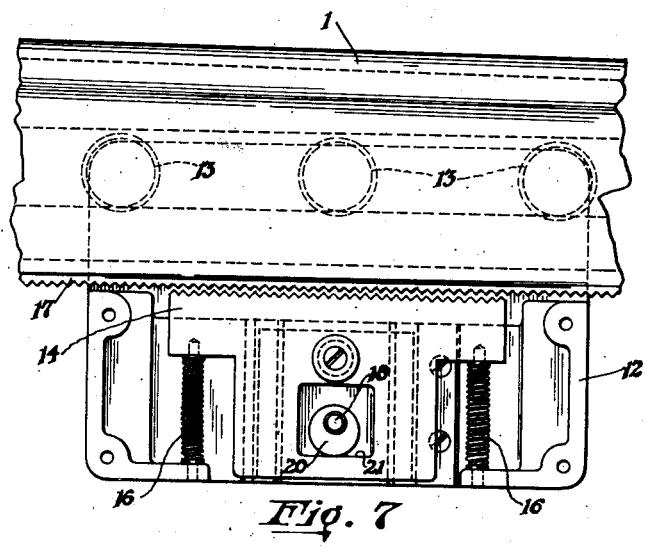
Fig. 7 is a fragmentary enlarged rear elevation showing details of the locking and aligning mechanism, certain parts being removed for clearness of disclosure.
Figure 8:
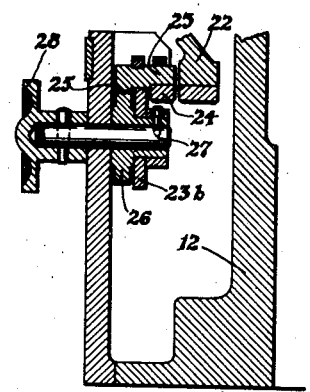
Fig. 8 is a fragmentary sectional view on the line 8—8 of Fig. 2.
Figure 10:
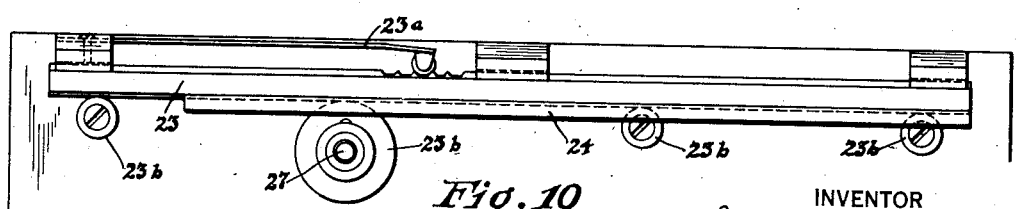
Fig. 10 is a detail enlarged view of the fractional poise.
Figure 11:
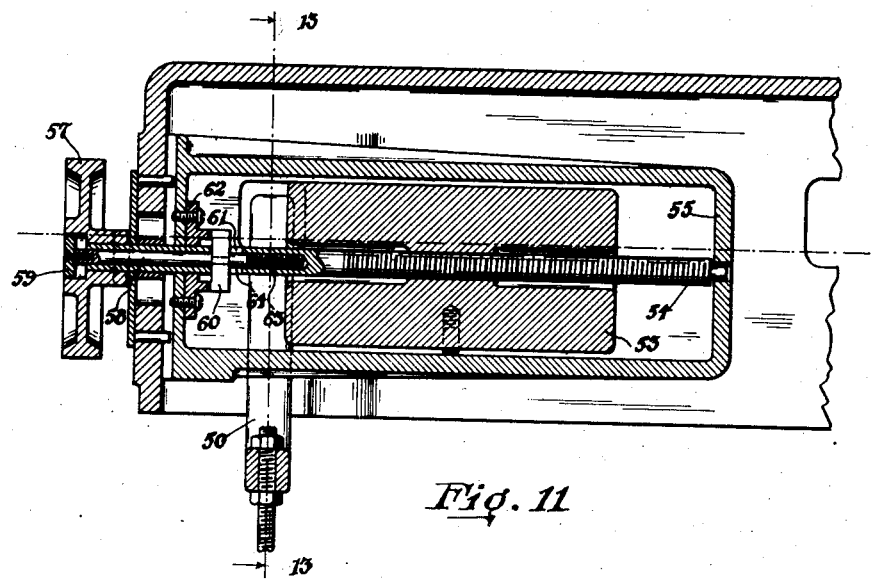
Fig. 11 is a vertical central sectional view through the rear end of the weigh-beam showing the poise adjusting mechanism, and back balance suspension.
Figure 12:
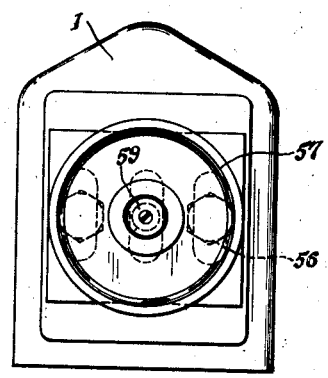
Fig. 12 is a rear end elevation of the beam.
Figure 13:
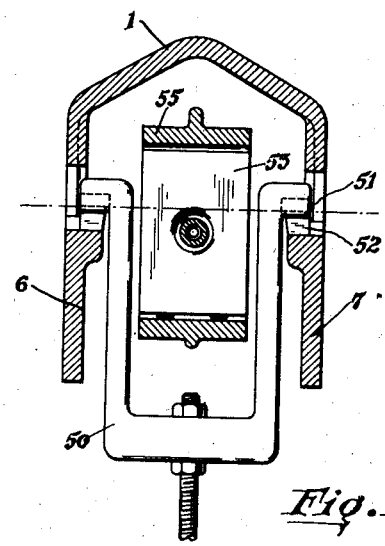
Fig. 13 is a transverse vertical sectional view on the line 13—13 of Fig. 11.

As shown, the weigh-beam 1 is pivotally supported upon a beam stand 2 attached to the upper surface of a beam shelf (not shown), a trig stand 3 being also supported on said shelf and arranged to cooperate with tip plate indicator 4 to indicate balanced position of the beam and to limit vertical swing thereof, or to lock the same in immovable position by means of the pivoted trig 5.

The beam is substantially channel-shaped or inverted U-shaped in cross-section, this form being well suited to resist distortion and particularly adapted to house and protect the movable poise with its associated mechanism. The downwardly extending walls 6 and 7 of the beam are provided on the inner surface with grooves 8 and 9 providing longitudinal tracks 10 and 11 for movably supporting the poise 12, the latter for this purpose having attached to the upper portion thereof three ball-bearing rollers 13 disposed substantially at the angles of an isosceles triangle with its base disposed at one side of the poise and lying parallel to the track, as shown in Figs. 2 and 5. This arrangement of rollers provides means for constant distribution of the weight of poise 12 on the beam irrespective of slight irregularities in the track surface or roller bearings, each roller always contacting with its track surface under all conditions of service, and constitutes a three-point type of suspension which provides means whereby the line of suspension passing through the center of gravity is unchanging and not subject to redisposition with respect to the bearing points of the poise.

It is also important that positive means be provided to align exactly the poise with respect to the beam in all its indicating positions and to lock the same in aligned position. For this purpose a multiple-toothed locking plate or pawl 14 is slidably mounted in the poise by means of slide 15 and is normally pressed by springs 16 into engagement with a plate 17 extending along the edge of wall 7 of the beam and having downwardly facing teeth or serrations corresponding to and co-operating with the teeth of plate 14. Means for moving plate 14 out of engagement with plate 17 is provided by a shaft 18 having an operating handle 19 at the front and carrying an eccentric cam 20 at the back extending into an opening 21 in a portion of slide 15 attached to plate 14. A type rail 22 carrying type corresponding to various weights is carried by a wall of the beam, and a fractional slide or poise 23 held in adjusted position by a snap pawl 23ª is slidably mounted on rollers 23ᵇ in poise 12 and carries type 24 disposed adjacent to the type on rail 22. Slide 23 is also adapted for longitudinal travel or adjustment by means of a rack 25 and co-operating pinion 26 on a shaft 27, the latter carrying at its front end a hand wheel 28 for manual adjustment of the fractional poise. A printing hammer or dog 29 is slidably mounted to co-operate with the type to print weights on a ticket which may be inserted into position through a slot 30, the hammer being controlled by an eccentric cam 31 spaced on shaft 18 from cam 20 and having its major ordinate disposed at an angle to that of cam 20. Angularly disposed arms 32 and 33 are secured on shaft 18 with springs 34 and 35 attached respectively thereto, the springs being tensioned to normally urge the shaft to the position shown in Fig. 1 corresponding to the locking position of plate 14, with the poise 12 held against movement.

An index 36 is carried by poise 12 co-operating with a scale 37 attached to the beam and suitably graduated in weight units. Fractional poise 25 also carries an index 38 co-operating with a graduated scale 39 on poise 12. The indicated weight is thus easily read from the graduated scales when the balance of the beam is obtained.

Spaced knife edge bearings 40 are disposed in opposite walls of the beam as shown in Fig. 4, the walls being suitably thickened to provide ample supporting surface and these bearings cooperate pivotally with bearing blocks 41 on the beam stand. This type of construction provides a decided advantage over old types since the knife edge bearings are rigidly supported in true alignment and are not easily susceptible to distortion or deviation from normal position.

A power transmission rod 42 extends from its connection with suitable scale levers (not shown) to an improved connection shown in Fig. 3 for transmitting the load stresses to the weight beam. Knife edge bearings 43 supported in thickened portions of the beam walls are arranged to co-operate pivotally with bearing blocks 44 in centrally disposed saddle 45 having a central opening for receiving the rod 42. On its upper face this block is provided with spaced aligned depressions 46 for receiving projections or trunnions 47 on the lower face of a nut 48 suitably threaded to said rod, providing for pivotal movement substantially at right angles to the pivotal movement provided by the knife edge bearings. This connection is self-compensating in all directions for wear and minor distortions, is self-locking in adjusted positions and transmits the load stresses in the central plane of movement of the beam.

A back balance poise (not shown) is preferably suspended from the rear end portion of the beam by means of a rod and loop 50, the loop being substantially U-shaped and disposed centrally of the beam walls and having spaced bearing blocks 51 pivotally co-operating with bearings 52 in the beam wall. As will be understood, counterpoise weights are added to or subtracted from the counterpoise rod until the excess or deficiency in the balanced condition is within range of the balancing power of the balance ball.

Means for completing the precise balancing of the beam in zero or no load position is provided by a balance ball 53 movable longitudinally to adjust the center of gravity of the beam relatively to its points of support. A rod 54 threaded to said ball is rotatably mounted in a frame 55 adjustably supported by bolts 56 passing through slots in the end wall of the beam, the frame being disposed between the side walls of the beam which provide a housing therefor, and the ball being restrained from rotation by said frame. The rod 54 extends through the end wall of the beam and is provided at its outer end with an operating hand wheel 57. The rod is also centrally recessed for the reception of a longitudinally movable lock releasing pin 58. The releasing pin carries at its outer end an operating button 59 disposed concentrically with respect to operating wheel 57 and adapted to be pressed by a thumb or finger of the operator's hand, the same hand being employed to simultaneously turn the hand wheel. Pin 58 is connected at its inner end with a double ended locking pawl 60 having laterally disposed teeth at both ends thereof and disposed in a slot 61 through the operating rod 54 and pressed into engagement with a circular toothed locking plate 62 by means of a spring 63 and follower 64 disposed in said central recess. The locking plate 62 is arranged concentrically with rod 54 whereby its locking teeth are engageable by the locking pawl in any angular position of the latter.

In operation, the beam having been previously balanced for zero position, and the parts being in the positions shown in Fig. 1, the handle 19 is grasped by the hand of the operator and turned about 45° in clockwise direction to vertical position as shown in Fig. 2, the latch cam 20 engaging the lower wall of opening 21 in the latch slide to move the latter with the latch downwardly against the tension of springs 16 disengaging the co-operating locking teeth from each other. The poise 12 is then rolled along the beam until an approximate balance is reached, the handle 19 being then returned to its normal or locking position under the influence of spring 34, and the springs 16 then act to press the movable locking plate 14 into engagement with plate 17 to align and lock the poise in proper relative position to the beam. In this connection it is noted that locking plate 14 extends for a substantial distance along its co-operating toothed plate, the engaging faces acting to bring the poise into definite alignment and the teeth engaging to lock the poise in position. The plane of co-action between the locking plate 14 and the plate 17 lies intermediate the supporting tracks for the poise and the center of mass of the latter, so that engagement of the extended surfaces of these plates will compel definite alignment of the poise with respect to its supporting bearings upon the beam. This is an advantageous feature, increasing the accuracy of the scale in cases of slight angular displacements of the poise from its normal position either on transverse or longitudinal lines. Such displacements may be due to different causes, such as irregularities in the poise support. Engagement of the co-operating serrated faces of the locking plates under such conditions will bring the poise into proper relative alignment with the beam so as to exert the correct force thereon in all its various operative positions. Accuracy in positioning the poise is enhanced because of the fact that irregularities in the spacing of teeth in the locking plate or rack due to wear or inexact construction are averaged by engagement of a plurality of teeth, it being understood that the poise 12 is adjusted only to positions corresponding to whole graduations on the scale, each graduation in the embodiment illustrated representing 1000 lbs. The teeth of plate 17, it will be noted, point downwardly whereby the accumulations of foreign particles thereon is rendered unlikely. Fine adjustment for obtaining a final balance is made by means of the fractional poise 26, this being accomplished by means of the hand wheel 28. Adjustments of the poise 12 and fractional poise 23 bring proper numerical values of type to represent the weight opposite the printing dog 29, and the weight may then be printed on a suitable ticket (inserted in slot 30) by turning the handle 19 about 22° counterclockwise from the locking position shown in Fig. 1, thus bringing the cam 31 in position to operate the printing dog, the cam 20 in this movement remaining inoperative because of the fact that its operative face is angularly disposed from that of the first mentioned cam. The weight may also be read directly from graduated scale plates 37 and 39 by aid of indices 36 and 38. When the operating handle is released after printing it is returned automatically to normal position by operation of spring 35.

The poise 12 is constructed to present a substantially smooth external surface resisting the collection of dirt, moisture and other foreign matter, and its suspension mechanism and other operative parts are housed in the beam frame so as to be effectively protected from accumulations of dirt and moisture, and so that rust and corrosion is thus prevented and the precision and life of the apparatus materially increased.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent is:

1. A weigh-beam for scales having a longitudinally extending recess on the underside thereof, and a poise mounted in said recess and longitudinally movable along said beam, said poise having a three-point suspension with the said beam.

2. In combination, a weigh-beam for scales, a poise for said weigh-beam, and means for suspending said poise at a plurality of points on said weigh-beam for longitudinal adjustment thereon, the supporting points of said suspending means being arranged in triangular form and being substantially horizontally disposed so the line of support passing through the center of gravity of the poise is substantially constant relative to said points when the poise is in weighing position or when it is being adjusted along the weigh-beam.

3. In combination, a weigh-beam for scales provided with a longitudinal recess forming a housing, a poise for said weigh-beam, and means for supporting said poise at a plurality of points on said weigh-beam for longitudinal adjustment in said housing, the supporting points of said supporting means being relatively disposed so the line of support passing through the center of gravity of said poise is substantially constant relative to said points when the poise is in weighing position or when being adjusted along the weigh-beam.

4. In a scale, in combinaiton, a weigh-beam, a movable poise, and suspending means for said poise, having a three-point supporting contact with said beam arranged for constant suspending engagement therewith, when a balance is reached or during adjustment of the poise along the weigh-beam.

5. In combination, a weigh-beam providing a housing, and a movable poise in said housing entirely supported at three points on said beam, when a balance is reached or during adjustment of the poise along the weigh-beam.

6. In a scale, in combination, a downwardly opening substantially channel-shaped weigh-beam, a poise housed in the channel of said weigh-beam, and means for aligning and locking said poise with respect to said weigh-beam.

7. In a scale, in combination, a weigh-beam, an adjustable poise supported on said beam, a plate movably mounted on said poise and having an elongated contact surface co-operating with said weigh-beam, and resilient means for urging said plate into engagement with said weigh-beam to lock said poise in position and compel angular alignment thereof.

8. In combination, a weigh-beam, an adjustable poise supported on said beam, a plate having an elongated surface for co-operating with said weigh-beam, a slideway on said poise for slidably mounting said plate thereon, and resilient means for urging said plate into engagement with said weigh-beam for locking the poise in position.

9. In combination, a weigh-beam, an adjustable poise supported on said beam, locking means for said poise including multiple toothed interengaging plates on said beam and poise whereby errors in adjustment due to operation thereof are minimized, resilient means for urging one of said plates into engaging position with the other, and cam mechanism for releasing said engagement.

10. In combination, a weigh-beam, an adjustable poise supported on said beam, co-operating means on said beam and poise to cause definite alignment of the latter with respect to the former, manually operated cam operating means for said co-operating means, and printing mechanism adapted to be operated by said operating means.

11. In combination, a weigh-beam, an adjustable poise supported on said beam, plates on said beam and poise having co-operating serrated faces, one of said plates being laterally movable with respect to the other, printing means for said beam, and common means for independently controlling said printing means and said movable plate.

12. In combination, a channeled weigh-beam having downwardly extending walls, tracks on the inner surfaces of said walls, a movable poise, and rollers for supporting said poise on said tracks.

13. In combination, a weigh-beam having downwardly extending walls, tracks on the inner surfaces of said walls, a movable poise, rollers for supporting said poise on said tracks, type carried by said beam, and a printing hammer co-operating with said type.

14. In combination, a weigh-beam having downwardly extending walls, tracks on the inner surfaces of said walls, a movable poise, rollers for supporting said poise on said tracks, and a fractional poise carried by and adjustable with respect to said first mentioned poise.

15. In combination, a weigh-beam having spaced parallel walls, tracks carried by said walls, a movable poise, rollers for supporting said poise on said tracks, a fractional poise adjustable with respect to said first mentioned poise, type carried by said beam and said fractional poise, and a printing hammer co-operating with said type to record the weight.

16. In combination, a weigh-beam having downwardly extending walls, tracks carried by said walls, a movable poise, rollers for supporting said poise on said tracks, a fractional poise adjustable with respect to said first mentioned poise, type carried by said beam and said fractional poise, a printing hammer co-operating with said type to record the weight, locking means for said first mentioned poise, and means to independently actuate said locking means and said printing mechanism.

17. In combination, a weigh-beam having a serrated surface, a poise, a locking and aligning element for said poise having a serrated surface adapted to co-operate with said first mentioned surface and normally urged into co-operative relationship therewith, and a spring pressed cam for controlling the operation of said locking element.

18. In combination, a weigh-beam having a serrated surface, a poise, a locking and aligning element slidably mounted on said poise and having a serrated surface adapted to co-operate with said first mentioned surface, and a spring pressed cam for controlling the operation of said locking element.

19. In combintion, a weigh-beam having an aligning element, a traveling poise therefor, an aligning element on said poise, and resilient means for urging one of said elements into engagement with the other for aligning said poise with respect to said beam, the engaging surfaces of said elements being extended and having a plurality of interengaging teeth to provide locking means for said poise.

20. In a weighing device, in combination, a channeled weigh-beam having spaced downwardly extending walls, means to transmit load stresses to said beam centrally of said walls, and a poise mounted in the channel of said weigh-beam, and having a three-point suspension with said weigh-beam.

21. In a weighing device, in combination, a weigh-beam having spaced walls, a transmission rod, and a connection self-compensating in all directions to transmit load stresses from said rod to said weigh-beam.

22. In a weighing device, in combination, a weigh-beam having spaced walls, and adjustable self-locking means for transmitting load stresses to said beam centrally of said walls.

23. In a weighing device, in combination, a weigh-beam having spaced walls, and adjustable self-locking means to transmit load stresses to said beam, said means being self-compensating in all directions.

24. In a weighing device, in combination, a weigh-beam, a bearing block pivotally connected to said beam, and adjustable self-locking means pivotally connected to said block for transmitting load stresses thereto.

25. In combination, a weigh-beam having a recess in the underside thereof providing spaced walls, spaced bearings in said walls, and a beam support extending into said recess and having spaced bearings pivotally engaging the bearings in said walls.

26. In combination, a weigh-beam having spaced walls, bearings in said walls, and a beam stand having spaced bearings engaging the bearings in said walls, and means for transmitting load stresses to said beam centrally of said walls.

27. In a scale, a weigh-beam having a poise-track, a downwardly projecting serrated locking face below said track, and a bodily movable locking plate having an extended serrated face adapted to engage said locking face.

28. In a scale, in combination, a weigh-beam of substantially inverted U-shape in cross-section and having opposed poise-tracks within the side walls thereof, a traveling poise suspended from said tracks and extending below said side walls, and co-operating locking means on said beam and poise disposed to co-act in a plane between said tracks and the center of mass of said poise.

29. In a scale, in combination, a weigh-beam, a poise adjustably mounted on said weigh-beam, locking means for said poise, weight printing mechanism, and operating means adapted for alternate actuation of said locking means and said weight printing mechanism.

30. In a scale, in combination, a weigh-beam, a poise adjustably mounted on said weigh-beam, locking means for said poise, weight-printing mechanism, operating means adapted for alternate actuation of said locking means and said weight-printing mechanism, and resilient means for returning said operating means to normal position after an actuating movement thereof.

31. In a scale, in combination, a weigh-beam, a poise adjustably mounted on said weigh-beam, a locking pawl having a multiple toothed contact surface co-operating with said weigh-beam and movably mounted on said poise, a manually operable cam rotatably carried by said poise for operating said pawl, and resilient means for returning said cam to normal position after an operation of said pawl thereby.

32. In a scale, in combination, a weigh-beam, a poise adjustably mounted on said weigh-beam, a locking pawl having a multiple toothed contact face co-operating with said weigh-beam and being mounted for bodily movement upon said poise, resilient means normally urging said pawl into locking position with said weigh-beam, a cam for operating said pawl, and resilient means for returning said cam to normal position after an operative movement thereof.

33. In a scale, in combination, a weigh-beam, a poise adjustably mounted on said weigh-beam, means for locking said poise on said weigh-beam, weight-printing mechanism, and a unitary means for successively operating said locking means and said weight-printing mechanism.

34. In a weighing device, in combination, a weigh-beam, a poise for said weigh-beam, and a three-point roller suspension for said poise.

35. In a weighing device, in combination, a poise for said weigh-beam, and a plurality of rollers connected to said poise and arranged in substantially triangular formation thereon and forming a three-point suspension for said poise.

36. In a weighing device, in combination, a weigh-beam, a poise for said weigh-beam, and a three-point suspension for said poise including a plurality of suspension members arranged substantially at the apices of an isosceles triangle having its base at one side of the poise.

In testimony whereof I affix my signature, in the presence of two witnesses.

MORTON H. STARR.

Witnesses:
PERLEY F. HAZEN,
MARIAN H. SUITOR.